US008205494B2

(12) United States Patent
Nicolini

(10) Patent No.: US 8,205,494 B2
(45) Date of Patent: Jun. 26, 2012

(54) MACHINE FOR BALANCING VEHICLE WHEELS

(75) Inventor: Roberto Nicolini, Rio Saliceto (IT)

(73) Assignee: Sicam S.R.L., Correggio (RE) (IT)

( * ) Notice: Subject to any disclaimer, the term of this patent is extended or adjusted under 35 U.S.C. 154(b) by 474 days.

(21) Appl. No.: 12/453,020

(22) Filed: Apr. 28, 2009

(65) Prior Publication Data

US 2010/0107757 A1 May 6, 2010

(30) Foreign Application Priority Data

Apr. 28, 2008 (IT) .............................. MO2008A0123

(51) Int. Cl.
*G01M 1/02* (2006.01)
*G01M 1/16* (2006.01)
(52) U.S. Cl. ............................................ 73/462; 73/487
(58) Field of Classification Search ...................... 73/462
See application file for complete search history.

(56) References Cited

U.S. PATENT DOCUMENTS

| 5,195,370 | A | * | 3/1993 | Hultberg | .......................... 73/459 |
| 5,821,416 | A | | 10/1998 | Hjort-Hansen | |
| 6,289,962 | B1 | | 9/2001 | Klein | |
| 6,484,574 | B1 | * | 11/2002 | Douglas et al. | ................. 73/462 |
| 7,337,664 | B2 | | 3/2008 | Matteucci et al. | |
| 2006/0284147 | A1 | * | 12/2006 | Matteucci et al. | ............. 254/84 |
| 2007/0069571 | A1 | * | 3/2007 | Matteucci et al. | ........... 301/5.21 |
| 2008/0053223 | A1 | | 3/2008 | Montanari | |

FOREIGN PATENT DOCUMENTS

| DE | 4125809 | 2/1993 |
| DE | 19741751 | 3/1999 |
| WO | WO 91/08163 | 6/1991 |
| WO | WO 99/40406 | 8/1999 |

OTHER PUBLICATIONS

European Search Report issued in corresponding European patent No. 09158360 on Dec. 6, 2011.

* cited by examiner

*Primary Examiner* — Hezron E Williams
*Assistant Examiner* — Gregory J Redmann
(74) *Attorney, Agent, or Firm* — Stein McEwen, LLP

(57) ABSTRACT

The machine for balancing vehicle wheels comprises a base frame supporting a substantially horizontal balancing spindle, a lifting device for lifting a vehicle wheel to be fitted/removed to/from the balancing spindle, contact-free reading means of the profile of the tire associated with the base frame, and a processing and control unit operatively associated with the lifting device and with the reading means and suitable for calculating the position of the center of the wheel in accordance with the values read by the reading means, and for stopping the lifting device in an end-of-lifting position, in which the wheel center is substantially at the same height as the balancing spindle.

29 Claims, 3 Drawing Sheets

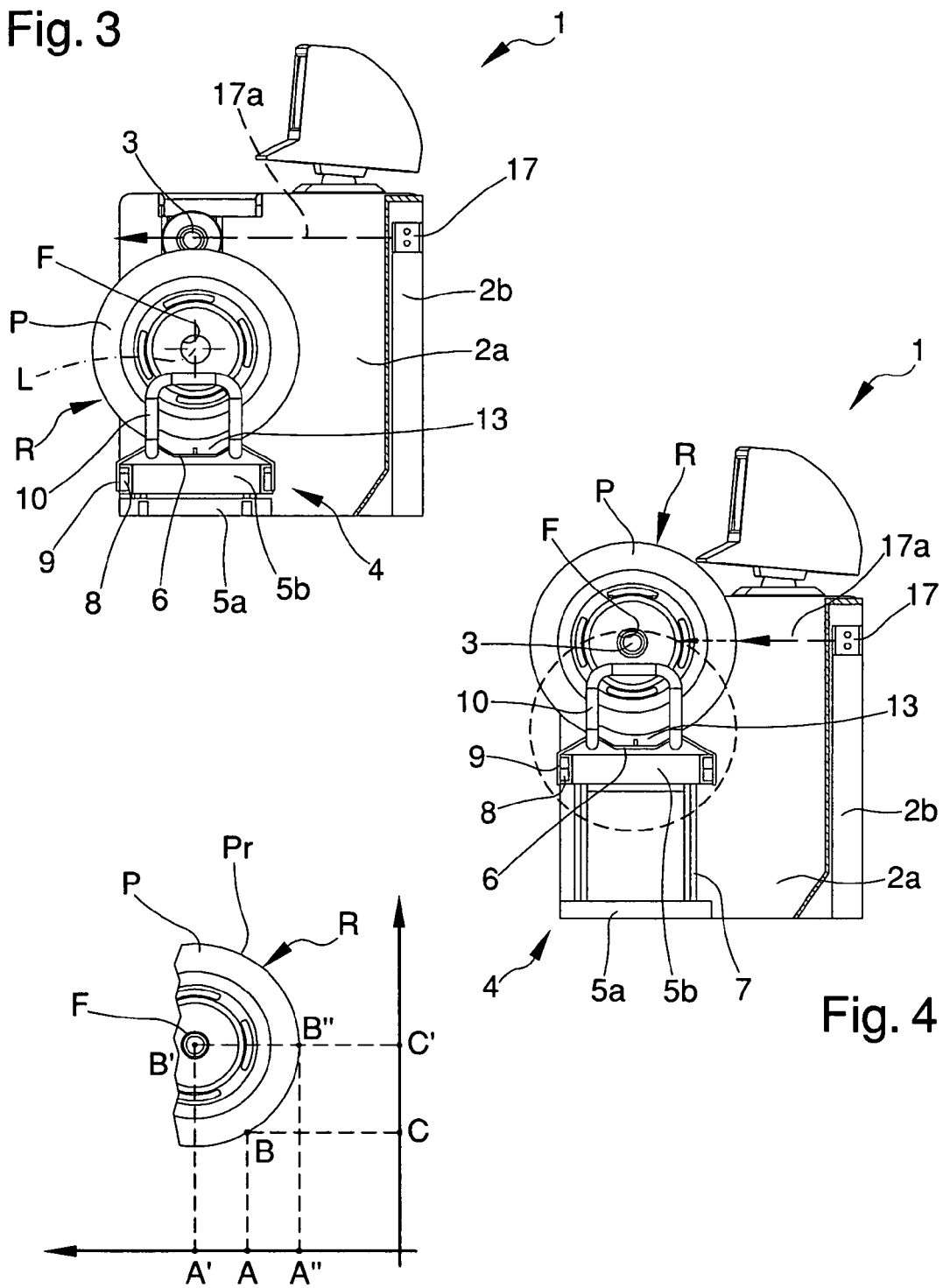

MACHINE FOR BALANCING VEHICLE WHEELS

FIELD OF THE INVENTION

The present invention relates to a machine for balancing vehicle wheels.

BACKGROUND OF THE INVENTION

It is known that the wheels of vehicles are generally made up of a cylindrical metal rim having, at the axial extremities, annular flanges between which the beads of the tyre are interlocked.

These wheels require frequent balancing operations which consist in applying to the rim of the wheel small weights, made of lead or other material, suitable for offsetting the irregular distribution of the tire weights.

To perform such operation, balancing machines are commonly used having a rotating spindle, so-called "balancing spindle", on which the wheel to be balanced must be positioned integral in order to start it rotating and determine its unbalance.

The balancing spindle is arranged horizontally at a preset distance from the ground and the wheel is normally fitted on it manually by an operator who lifts the wheel up by hand and positions it coaxially on the balancing spindle.

Such manual operations are often uncomfortable and tiring for the operator, particularly when the wheel to be balanced is very heavy and large.

To make the operator's task easier, lifting devices made up of a platform which is mobile both along a vertical direction and along a direction parallel with the balancing spindle may be utilized.

The wheel to be balanced is allowed to roll onto the platform positioned near the ground and here is kept in vertical position, meaning balanced on the tread and with its rolling axis arranged horizontally.

To maintain the vertical position, the operator keeps one or both hands on the wheel, thereby preventing the wheel from falling; alternatively, the platform can, if necessary, be equipped with a locking vice which is tightened on the opposite sides of the wheel, restricting any possible movement.

In the vertical position, the wheel is lifted up to the height of the balancing spindle by means of the operation of a hydraulic and/or pneumatic actuator that causes the platform to elevate, and is then fitted coaxially on the balancing spindle by means of the horizontal movement of the platform itself.

Once fitted, the wheel is fastened on the balancing spindle by means of specific centering and fastening means and, subsequently, is rotated to calculate its unbalance.

The wheel unbalance measurement is read by special electronic or electro-mechanical devices, such as force transducers fitted along the balancing spindle.

To the unbalance measurement are generally added other characteristic measurements, such as the measurement of the roundness of the wheel, the eccentricity of the wheel, the amount of wear of the tread, etc., normally done by means of contact-free measurement sensors (laser, ultrasounds or the like), fitted on the machine frame and substantially turned towards the balancing spindle.

The balancing machines of traditional type are, however, susceptible to further upgrading, aimed at increasing their functionality and efficiency of use.

In this respect, the fact is emphasized that, including in the presence of a lifting platform, the phase of fitting the wheel on the balancing spindle is not always practical and easy, taking into account the need for the operator to correctly align the balancing spindle and the center of the wheel before coupling these together.

This operation is, in fact, performed visually by the operator, who operates the hydraulic and/or pneumatic actuator for lifting the platform until he/she considers the balancing spindle and the centre of the wheel to be aligned.

This operation, therefore, inconveniently keeps the operator engaged for a certain amount of time and is unfortunately subject to the sensitivity and the experience of the operator, and to possible alignment errors.

In this respect, any alignment errors by the operator make it necessary to repeat the operation and, therefore, determine a further extension of execution times, with the consequent increase in labour costs and total costs for the end customer.

BRIEF SUMMARY OF THE INVENTION

The main aim of the present invention is to provide a machine for balancing vehicle wheels that permits achieving the aforementioned upgrading, allowing the operator to position the wheel to be balanced on the balancing spindle in a practical, easy and functional way, and above all with reduced execution times.

A further object of the present invention is to allow the operator to simplify wheel fitting and removal operations and permit him/her to dedicate him/herself mainly to the other balancing machine operations to ensure its correct operation.

Another object of the present invention is to provide a machine for balancing vehicle wheels which allows to overcome the above-described drawbacks of the background art with a simple, rational solution that is easy and efficient to use and low in cost.

The above objects are achieved by the present machine for balancing vehicle wheels, comprising a base frame supporting a substantially horizontal balancing spindle, at least a lifting device for lifting at least a vehicle wheel to be fitted/removed to/from said balancing spindle, and contact-free reading means of at least a portion of the profile of the tire associated with said base frame, wherein it comprises at least a processing and control unit operatively associated with said lifting device and with said reading means and suitable for calculating the position of the center of said wheel in accordance with the values read by said reading means and for stopping said lifting device in an end-of-lifting position in which said wheel center is substantially at the same height as said balancing spindle.

Other characteristics and advantages of this invention will become more evident from the description of some forms of preferred, but not sole, embodiment of a machine for balancing vehicle wheels, illustrated purely as an example, but not limiting, in the annexed drawings.

BRIEF DESCRIPTION OF THE DRAWINGS

FIG. 3 is a side view of the machine in FIG. 1 in the initial departure position;

FIG. 4 is a side view of the machine in FIG. 1 in the end-of-lifting position;

FIG. 5 is a schematic view that shows the wheel to be balanced fitted in the reference system of the machine in FIG. 1;

DETAILED DESCRIPTION

Figure 1:
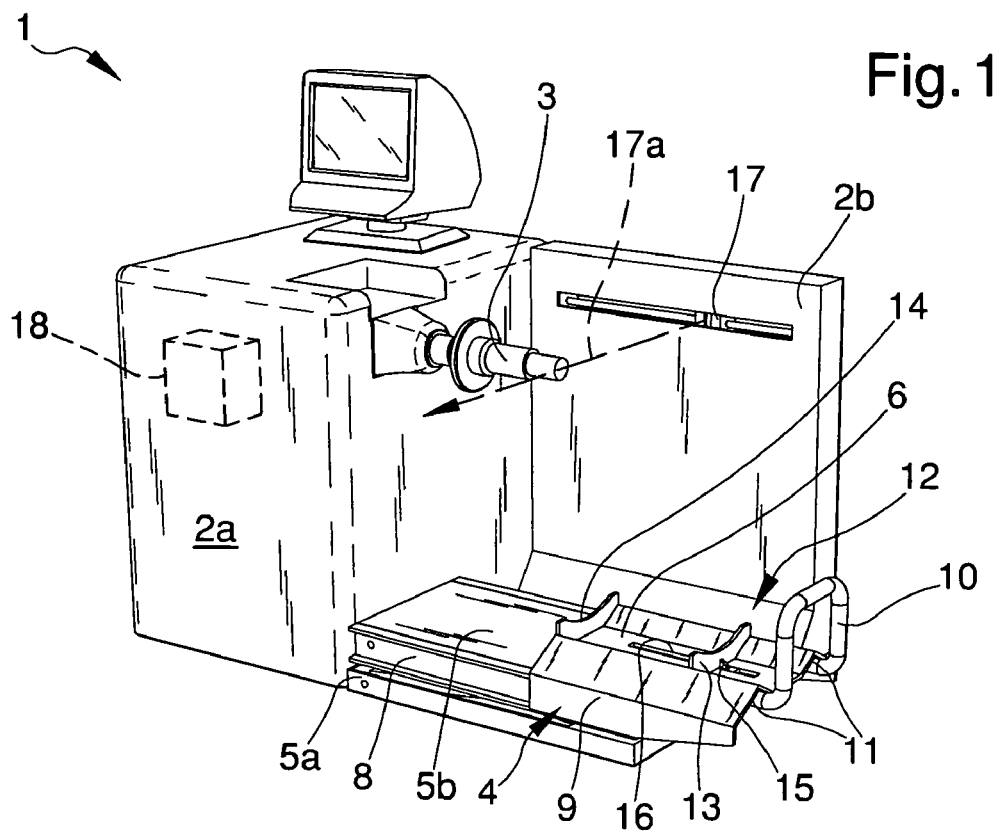
FIG. 1 is a perspective view of a form of embodiment of the machine according to the invention.
Figure 2:
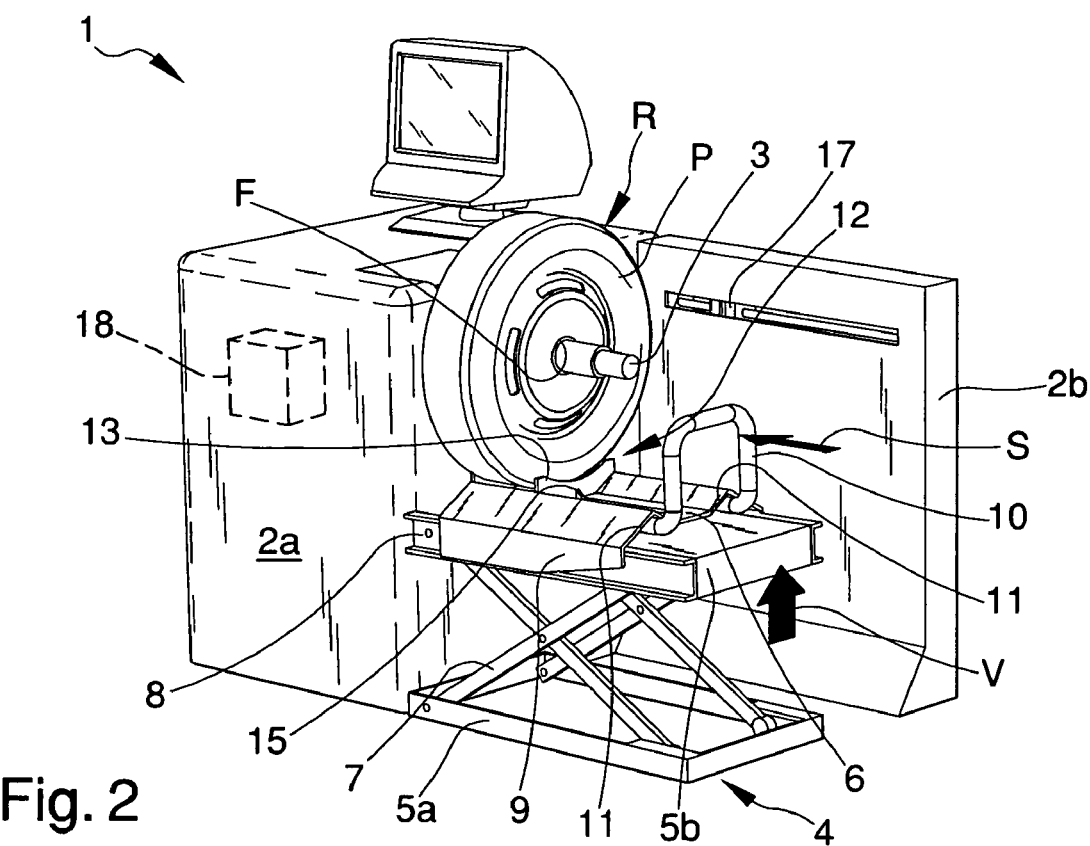
FIG. 2 is a perspective view of the machine in FIG. 1 at the end of the fitting operation of the wheel on the balancing spindle.

With particular reference to the embodiment of the FIGS. from 1 to 5, globally indicated by reference numeral 1, is a machine for balancing vehicle wheels.

The machine 1 comprises a base frame 2a, 2b supporting a rotating balancing spindle 3 for gripping and rotating a wheel R to be balanced.

The base frame 2a, 2b, in particular, is composed of a base block 2a, containing the support and motorization system of the balancing spindle 3, and a vertical wall 2b associated with a side of the base block 2a.

The balancing spindle 3 is horizontal and projects overhanging from the base block 2a parallel with the vertical wall 2b.

Near the balancing spindle 3 a lifting device 4 is arranged for fitting and removing the wheel R onto/from the balancing spindle 3.

In the particular embodiment of the invention shown in the FIGS. from 1 to 5, the lifting device 4 comprises a substantially horizontal base 5a, 5b supporting a platform 6 that can be lifted and lowered on which the wheel R is intended to be arranged resting; alternative embodiments cannot however be ruled out in which the lifting device 4 is of the type of a crane with a hook, or the like, to which the wheel R can be hung to be lifted up as far as the balancing spindle 3.

The base 5a, 5b is composed of a first portion 5a, that rests on the ground, and of a second portion 5b, associated with the first portion 5a by interposition of first automated actuator means 7 fluid driven (pneumatic or hydraulic), which are suitable, during operation, for lifting and/or lowering the platform 6 along a vertical direction V.

The platform 6 is mounted on the second portion 5b of the base 5a, 5b by interposition of sliding means 8, 9 of the platform 6 along a sliding direction S parallel with the balancing spindle 3.

The sliding means 8, 9 are composed of a pair of grooves 8 obtained on the side panels of the second portion 5b and engaged longitudinally by corresponding side appendices 9 of the platform 6.

The sliding means 8, 9, in actual fact, are suitable for making the platform 6 free to move horizontally by means of a thrust exercisable by the operator on a grip tubular 10 associated with the extremity of the platform 6 opposite with respect to the balancing spindle 3.

Advantageously, the platform 6 has centering means 11 for positioning the wheel R in a substantially vertical operating position, i.e. balanced on the tread and with its rolling axis L arranged horizontally and parallel with the balancing spindle 3.

In detail, the centering means 11 are composed, for example, of two triangular-section obstacle ridges, elongated along a longitudinal direction parallel with the balancing spindle 3 and suitable for acting as obstacle wedges to prevent the wheel R rolling on the platform 6.

Usefully, the lifting device 4 is placed below the balancing spindle 3 so that, once the wheel R has been arranged in operating position, the rolling axis L of the wheel is coplanar with the vertical position plane of the balancing spindle 3.

This arrangement permits vertically lifting the wheel R and aligning the rolling axis L with the balancing spindle 3 once the platform 6 has reached a preset height.

The platform 6 also has removable locking means 12 for locking the wheel R in the operating position.

Advantageously, the removable locking means 12 are of the vice type and comprise a first jaw 13 and a second jaw 14 associated with the platform 6.

The second jaw 14 is associated integral with the extremity of the platform 6 opposite the grip tubular 10, while the first jaw 13 is made mobile during movement closer to and away from the second jaw 14 along a direction parallel to the rolling axis L of the wheel R, so that, in operating position, the jaws 13, 14 are positioned right up against the opposite sides of the wheel R.

The operation of the first jaw 13 is of the automated type and is obtained by means of second automated actuator means suitable for moving the first jaw 13.

The second automated actuator means are not shown in detail in the illustrations and are composed of one or more fluid-operated jacks (pneumatic or hydraulic), associated below the platform 6 and connected to the first jaw 13 by interposition of a connecting bracket 15 sliding along a slit 16 obtained through the platform itself.

On the vertical wall 2b reading means 17 are arranged of the contact-free type suitable for reading, at least in part, the profile Pr of the tire P of the wheel R.

In the particular embodiment of the invention shown in the FIGS. from 1 to 5, the reading means 17 are composed of an optical sensor of the laser type, which emits a laser signal 17a directed along a horizontal direction substantially at right angles to the balancing spindle 3; alternatively, the sensor 17 can be of the ultrasonic type and made up, for example, of a sonar or the like.

During the balancing phase of the wheel R, the sensor 17 is intended to determine the position of a discrete series of points of the profile Pr of the tire P made to rotate around the balancing spindle 3 to determine possible geometric defects of the wheel R.

During the phase of fitting of the wheel R on the balancing spindle 3, on the other hand, the sensor 17 triggers to permit a correct and quick alignment of the wheel R and the balancing spindle 3.

For this purpose, the machine 1 has a processing and control unit 18 which is operatively associated with the first automated actuator means 7 and with the sensor 17 and is suitable for calculating the position of the center F of the wheel R according to the values read by the sensor 17 and stopping the first automated actuator means 7 in an end-of-lifting position in which the center F of the wheel R is substantially at the same height as the balancing spindle 3.

In particular, when the platform 6 is made to move vertically as a result of the operation of the first automated actuator means 7, the sensor 17 starts to read the profile Pr of the wheel R according to the height reached by the platform 6.

More in detail, the sensor 17 is suitable for reading the distance of the profile Pr of the wheel R according to the height reached by the platform 6 with respect to a preset reference system, schematically shown in the FIG. 5.

In the layout of FIG. 5, each height reached by the platform 6 is defined by a segment AB and corresponds to a value measured by the sensor 17 which in turn is defined by a corresponding segment BC.

The interpolation of the values AB and of the values BC permits obtaining the profile Pr of the wheel R.

In such reference system, the position A'B' of the center F of the wheel R is calculated by the processing and control unit

18 at the position A"B" in which the minimum distance B'C' of the profile Pr is read by the sensor 17.

Taking into account the substantial symmetry of the wheel R, in fact, when the sensor 17 reads the value B'C' of minimum distance from the tire P then the center F of the wheel R is at the same height off the ground as the sensor 17.

In this position, therefore, the processing and control unit 18 is able to place the center F of the wheel R inside the reference system of the machine 1 and command the lifting device 4 to align the center F of the wheel R with the balancing spindle 3.

The operation of the machine 1 is the following.

Initially, the operator positions the wheel R on the two obstacle ridges 11 of the platform 6 and starts the sliding of the first jaw 13 to block the wheel R in operating position.

At this point, the operator starts the fitting procedure of the wheel R causing the platform 6 to elevate.

Once the position A'B' of the center F of the wheel R has been identified in the reference system of the machine 1, the processing and control unit 18 commands the first automated actuator means 7 to lift and/or lower the platform 6 until this is stopped in the end-of-lifting position in which the center F of the wheel R and the balancing spindle 3 are aligned the one with the other.

In this position, the operator pushes the grip tubular 10 making the platform 6 slide along the sliding direction S and making the center F of the wheel R fit around the balancing spindle 3.

The operator then fixes the wheel R to the balancing spindle 3, commands the opening of the jaws 13, 14, repositions the platform 6 in the departure position and proceeds to perform the balancing operation of the wheel R.

Figure 6:
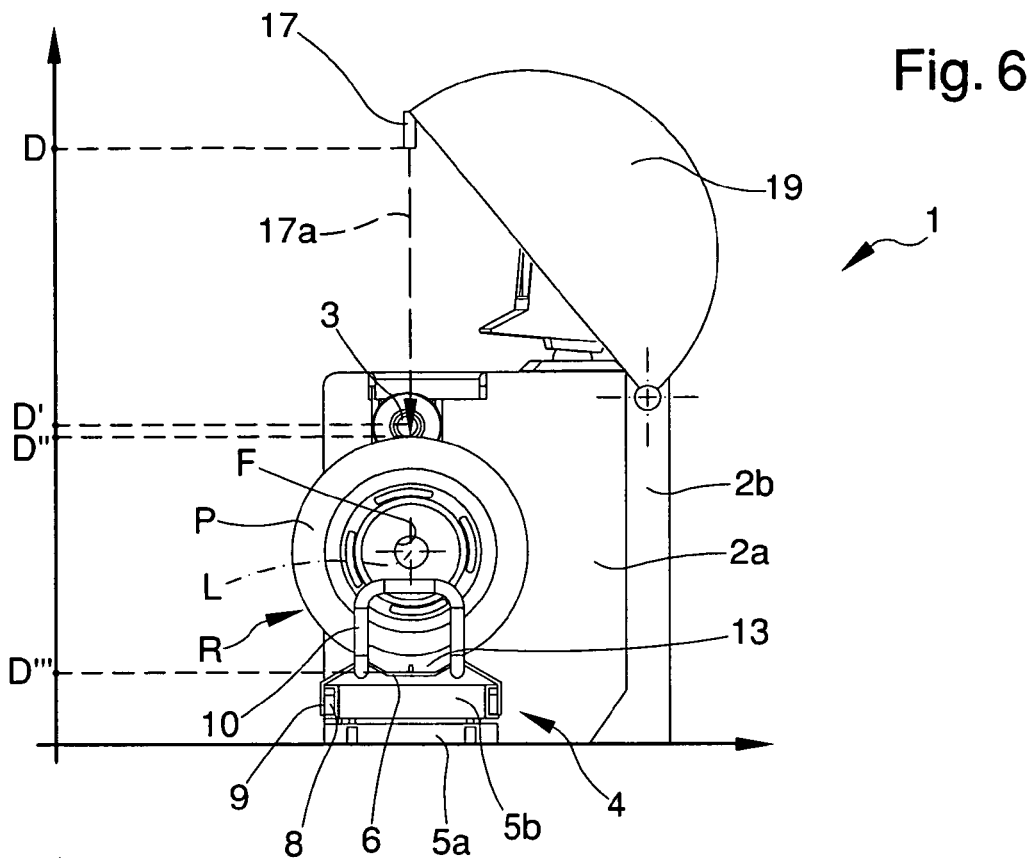
FIG. 6 is a side view of an alternative form of embodiment of the machine according to the invention, arranged in the initial departure position and fitted in the relative reference system.
Figure 7:
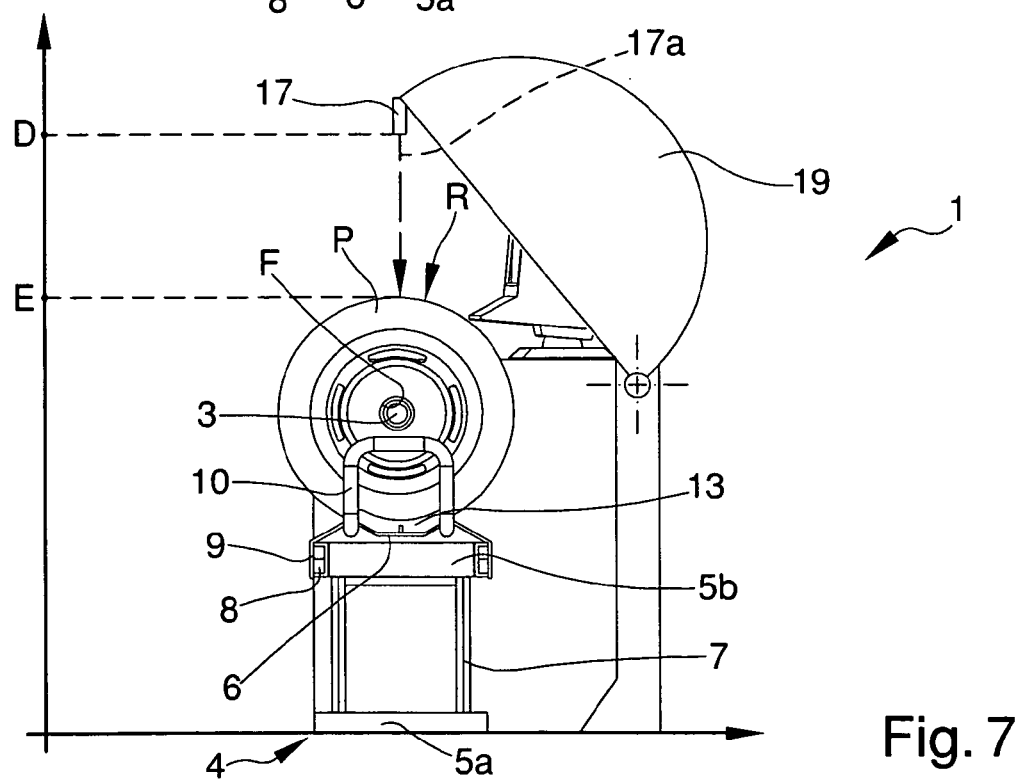
FIG. 7 is a side view of the machine in FIG. 1, arranged in the end-of-lifting position.

In an alternative embodiment shown in the FIGS. 6 and 7, the machine 1 has a traditional protection guard 19 which is associated with the vertical wall 2b in a turnable way between an idle configuration, in which the protection guard 19 is arranged lifted (FIGS. 6 and 7), and an operating configuration (not shown) in which the protection guard 19 is arranged partially covering the wheel R fitted on the balancing spindle 3.

In this embodiment, the sensor 17 is fitted on the protection guard 19 so that, in the idle configuration, the sensor 17 is arranged above the wheel R to be balanced and is directed along a substantially vertical direction which is coplanar to the balancing spindle 3.

The sensor 17 is therefore suitable for reading the distance of the profile Pr of the wheel R with respect to a reference system shown schematically in the FIGS. 6 and 7.

By means of the sensor 17, the processing and control unit 18 is able to calculate the diameter of the wheel R by comparing the distance of the wheel R from the sensor 17 and the distance of the platform 6 from the sensor 17 read at a same reference position of the lifting device 4.

Such reference position, for example, corresponds to the initial departure position, in which the platform 6 is arranged close to the ground.

In this position, before fitting the wheel R on the lifting device 4 the distance of the platform 6 from the sensor 17 can be read, corresponding to the segment DD''' of FIG. 6; when, on the other hand, the wheel R is fitted on the platform 6, then the sensor 17 measures the distance of the wheel R corresponding to the segment DD'' of the FIG. 6.

The processing and control unit 18 is therefore able to process the value of the diameter of the wheel R, corresponding to the segment D''D''' of FIG. 6, in agreement with the following formula:

$$D''D'''=DD'''-DD''$$

In the embodiment of the FIGS. 6 and 7, therefore, the position of the center F of the wheel R is calculated by the processing and control unit 18 according to the diameter D''D''' of the wheel R.

In particular, as the wheel R is gradually lifted onto the platform 6, the sensor 18 reads the distance of the wheel R, corresponding to the segment DE of the FIG. 7, and the processing and control unit 18 commands the stop of the lifting device 4 at the end-of-lifting position when the following formula occurs:

$$DE=DD'''-D'D'''-D''D'''/2$$

in which:

DE is the distance of the profile Pr of the wheel R read by the sensor 17 (FIG. 7);

DD''' is the distance of the platform 6 read by the sensor 17 in the departure position (FIG. 6);

D'D''' is the distance between the balancing spindle 3, placed in known position according to the construction specifications of the machine 1, and the platform 6 placed in departure position (FIG. 6);

D''D''' is the previously calculated diameter of the wheel R.

The operation of the machine 1 in the embodiment of the FIGS. 6 and 7 is the same as that of the embodiment of the FIGS. from 1 to 5 and, in order, consists of: positioning the wheel R on the platform 6; blocking the wheel R in the operating position; causing the platform 6 to elevate until it reaches the end-of-lifting position; causing the platform 6 to slide along the sliding direction S for manual thrust on the grip tubular 10; fastening the wheel R to the balancing spindle 3; commanding the opening of the jaws 13, 14; and finally repositioning the platform 6 in the departure position.

Other embodiments of the invention are possible not shown in the illustrations. In one of these, for example, the lifting device 4 has third automated actuator means with fluid operation (pneumatic or hydraulic) suitable for sliding the platform 6 along the sliding direction S and operatively associated with the processing and control unit 18.

In this embodiment, in point of fact, once the wheel R has been arranged in the operating position and the fitting procedure has been started, the machine 1 is able to operate independently both causing the platform 6 to elevate to the required height and causing it to slide along the sliding direction S.

In this way the machine 1 is able to move the wheel R from the ground up to the balancing spindle 3, thereby reducing the work of the operator.

In another embodiment, furthermore, the second automated actuator means suitable for moving the first jaw 13 are also associated with the processing and control unit 18 and can be automated for the purpose of fitting and/or removing the wheel R to/from the balancing spindle 3 without any intervention on the part of the operator.

Once the wheel R has been placed on the platform 6 in fact, the operator starts the fitting procedure and the processing and control unit 18 commands, in order: the closing of the first jaw 13; the lifting of the platform 6 until the center F of the wheel R is aligned with the balancing spindle 3; the sliding of the platform 6 along the sliding direction S; the moving away of the first jaw 13 from the second jaw 14; the lowering of the platform 6 for its return to the initial departure position.

The processing and control unit 18, furthermore, can be programmed to automatically command the lifting device 4 including during removal of the wheel R from the balancing spindle 3 without requiring any operator intervention.

It has, in point of fact, been seen how the described invention achieves the proposed objects.

In this respect, the fact is underlined that the machine according to the invention permits helping the operator considerably during wheel fitting and removal, by considerably cutting the total work times and the frequency of the jobs to be done to enable him/her to meanwhile dedicate his/her time to other jobs.

What is claimed is:

1. A machine for balancing vehicle wheels, comprising a base frame supporting a substantially horizontal balancing spindle, a lifting device for lifting a vehicle wheel to be fitted/removed to/from said balancing spindle, and contact-free reading means for determining a portion of the profile of the tire associated with said base frame, a processing and control unit operatively associated with said lifting device and with said reading means for calculating the position of the center of said wheel in accordance with the values read by said reading means and for stopping said lifting device in an end-of-lifting position in which said wheel center is at substantially the same height as said balancing spindle.

2. The machine according to claim 1, wherein said lifting device comprises at least a supporting platform for said wheel.

3. The machine according to claim 2, wherein said platform comprises centering means for positioning said wheel in a substantially vertical operating position.

4. The machine according to claim 3, wherein in said operating position the rolling axis of said wheel is substantially parallel with said balancing spindle.

5. The machine according to claim 4, wherein in said operating position the rolling axis of said wheel is substantially coplanar with the vertical position plane of said balancing spindle.

6. The machine according to claim 3, wherein said centering means comprise at least two obstacle ridges suitable for preventing said wheel from rolling on said platform.

7. The machine according to claim 6, wherein said obstacle ridges are elongated along a longitudinal direction substantially parallel with said balancing spindle.

8. The machine according to claim 2, wherein said lifting device comprises first automated actuator means for lifting said platform, and said first automated actuator means being operatively associated with said processing and control unit.

9. The machine according to claim 3, wherein said lifting device comprises removable locking means for locking said wheel on said platform in said operating position.

10. The machine according to claim 9, wherein said removable locking means are of the vice type.

11. The machine according to claim 10, wherein said removable locking means comprise at least a first jaw and a second jaw associated with said platform, at least said first jaw being made mobile during movement closer to and away from said second jaw along a direction substantially parallel to the rolling axis of said wheel.

12. The machine according to claim 11, wherein said lifting device further comprises second automated actuator means for moving said first jaw.

13. The machine according to claim 12, wherein said second automated actuator means are operatively associated with said processing and control unit.

14. The machine according to claim 2, wherein said lifting device comprises sliding means for moving said platform in a direction substantially parallel with said balancing spindle.

15. The machine according to claim 14, wherein said sliding means are suitable for making said platform free to slide along said sliding direction.

16. The machine according to claim 14, wherein said lifting device comprises third automated actuator means suitable for sliding said platform along said sliding direction and operatively associated with said processing and control unit.

17. The machine according to claim 1, wherein said lifting device is of the type of a crane.

18. The machine according to claim 1, wherein said reading means are selected from the list comprising: optical sensors and ultrasonic sensors.

19. The machine according to claim 18, wherein said optical sensor is of the laser type.

20. The machine according to claim 18, wherein said ultrasonic sensor is of the sonar type.

21. The machine according to claim 18, wherein said sensor is directed along a direction substantially at right angles to said balancing spindle.

22. The machine according to claim 18, wherein said sensor is directed along a substantially horizontal direction.

23. The machine according to claim 1, wherein said reading means are suitable for reading the distance of said profile of the wheel with respect to a reference system, the position of said center of the wheel being calculated by said processing and control unit at the position of minimum distance of said profile of the wheel with respect to said reference system.

24. The machine according to claim 18, wherein said sensor is directed along a substantially vertical direction.

25. The machine according to claim 18, wherein said sensor is directed along a substantially coplanar direction to said balancing spindle.

26. The machine according to claim 1, wherein said reading means are suitable for reading the distance of said profile of the wheel with respect to a reference system, the position of said center of the wheel being calculated by said processing and control unit according to the diameter of said wheel calculated by comparing the distance of said wheel from said reading means and the distance of said platform from said reading means at the same reference position.

27. A machine for balancing vehicle wheels, said machine comprising:
   a) a base frame supporting a substantially horizontal balancing spindle,
   b) a lifting device for lifting a vehicle wheel to be fitted to, or removed from, said balancing spindle,
   c) said lifting device including a supporting platform for receiving the vehicle wheel,
   d) actuator means for elevating said platform from a position below said balancing spindle;
   e) contact-free reading means for determining position of the profile of the tire associated with said base frame,
   f) a processing and control unit operatively associated with actuator means for said lifting device and with said reading means for calculating the position of the center of said wheel in accordance with the values read by said reading means,
   g) whereby the elevation of said platform is terminated when said wheel center is at substantially the same height as said balancing spindle.

28. The machine for balancing wheels as according to claim 27 further including a first jaw and a second jaw mounted on said platform, said first jaw being movable relative to said second jaw to block the vehicle tire in operating position relative to said balancing spindle.

29. The machine for balancing vehicle wheels as defined in claim 27 wherein said processing and control unit governs the movement of said first jaw on said platform.

* * * * *